Jan. 15, 1963   R. F. HOLBROW   3,073,650
MOUNTINGS FOR ROAD WHEELS
Filed May 2, 1960   2 Sheets-Sheet 1
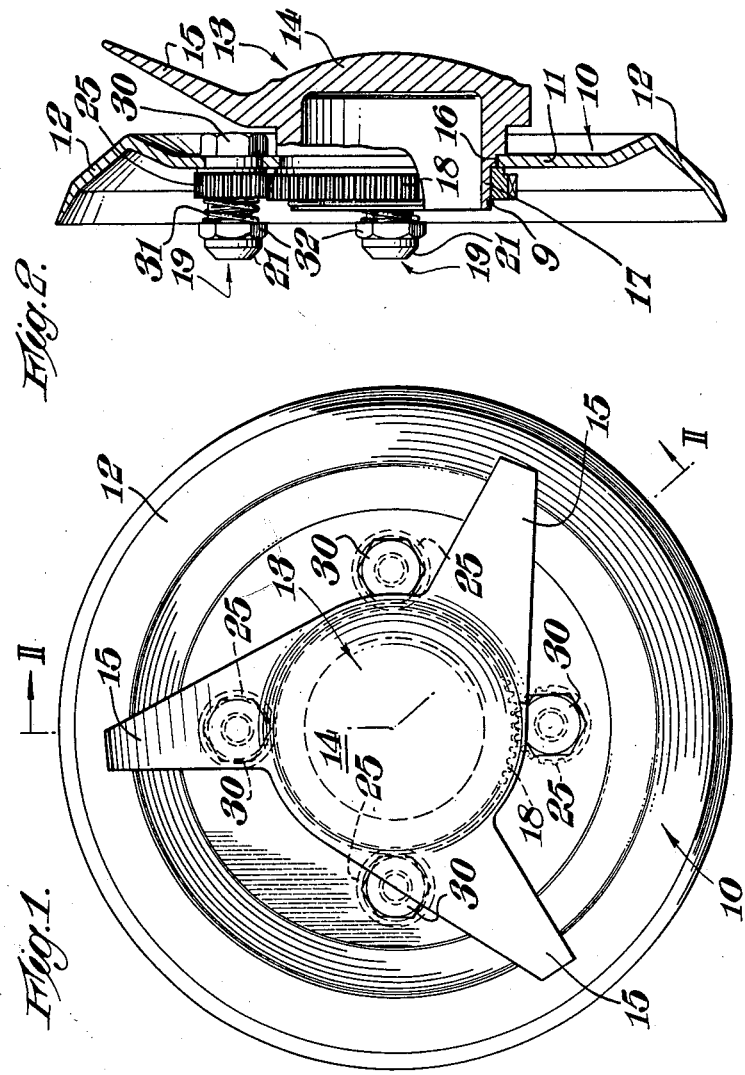

Jan. 15, 1963 R. F. HOLBROW 3,073,650
MOUNTINGS FOR ROAD WHEELS
Filed May 2, 1960 2 Sheets-Sheet 2

Inventor:
Richard F. Holbrow
By Kenron, Palmer & Stewart
Attorneys

United States Patent Office 3,073,650
Patented Jan. 15, 1963

3,073,650
MOUNTINGS FOR ROAD WHEELS
Richard F. Holbrow, Creek End, Burcot, England
Filed May 2, 1960, Ser. No. 26,157
Claims priority, application Great Britain May 6, 1959
16 Claims. (Cl. 301—9)

This invention relates to the mounting of vehicle road wheels, particularly disc or web wheels, and of the type adapted to be detachably fitted on threaded studs on a hub and secured thereon by nuts.

An object of the invention is to provide a wheel mounting device used on new or on existing vehicles without modification thereof very readily and rapidly to mount a wheel by a simple operation in which all the fixing nuts are screwed home simultaneously.

A further object is to provide in such a device means for enabling all the units to be evenly tightened even though one nut may bind in position before the other nuts, owing to irregularity in the wheel, the hub, the fixing nuts or any other cause.

According to the present invention there is provided a wheel mounting device comprising a mounting plate, a plurality of retaining nuts for the wheel studs mounted for rotation on the plate at positions corresponding to the positions of the studs on the hub, a pinion carried by each nut for rotating it, a sun gear wheel journalled in the plate for simultaneously rotating the pinions and thereby the nuts, and means for rotating the sun wheel.

In the preferred construction, the driving connection between each pinion and its associated nut is such that the connection is broken at a pre-set torque appropriate for binding the nut on its stud against the wheel. The driving connection may be a frictional connection. In a suitable arrangement the pinion is screwed on a shank of the nut and is pre-set for endwise frictional engagement with a friction plate fixed on the nut.

According to a feature of the invention there is means for augmenting the torque required to break the driving connection when the connection is being broken. To this end it is preferred that rotation of the pinions by the sun wheel to break the driving connection acts at the same time to increase the spring load of a spring provided for each pinion. It is preferably arranged that said plate is movable axially of the nut to compress said spring.

Forms of wheel mounting devices in accordance with the present invention are illustrated by way of example in the accompanying drawings, in which:

FIG. 1 is a front view of the mounting device,

FIG. 2 is a cross-sectional view of the device on the line II—II of FIG. 1,

Figure 3:
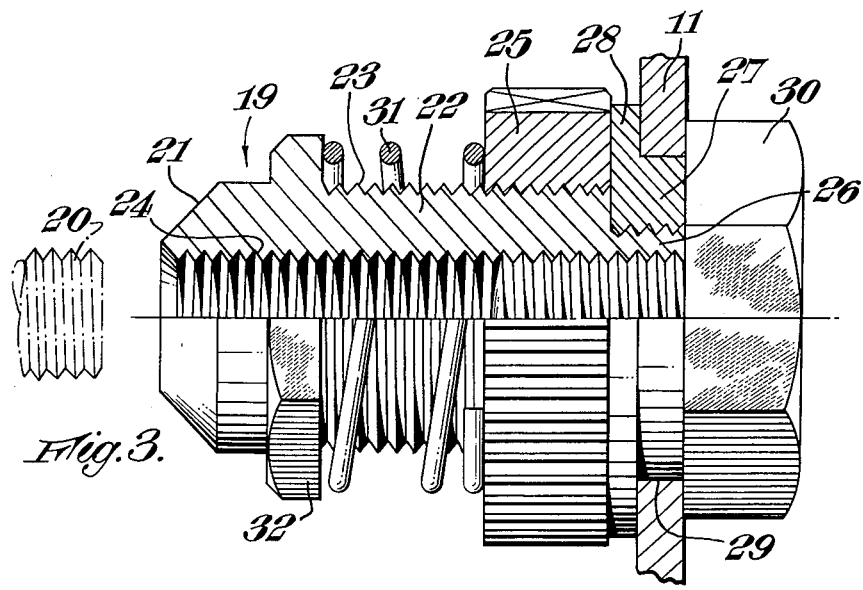
FIG. 3 is a side view, half in section, and on a larger scale, of one of the four nuts with its associated parts.

The wheel mounting device incorporates a circular plate 10 having a flat centre 11 and a flanged rim 12. A hub cap 13 is formed with a hollow boss 14 and three "knock-on" arms 15. The boss 14 is journalled at 16 within a central hole in the mounting plate 10. On an extension 17 of the boss at the inside of the plate is fixed a gear ring 18 which serves as a sun gear wheel. A face spring (not shown) is preferably located between centre 11 and either sun gear 18 or cap 14, the face spring exerting an axial thrust on cap 14 and taking up looseness due to wear.

For fixing the sun gear in position, its inner peripheral surface is knurled, and after the gear wheel has been pressed onto the hub cap, a spring clip 9 is positioned in a groove in the tip of the cap extension 17, as shown in FIG. 2.

Fitting on the mounting plate 10 around the sun wheel 18 are four equally-spaced nuts 19 for engagement with studs 20 (FIG. 3) carrying the wheel on the vehicle hub. As shown in FIG. 3, each nut is formed with a coned inner end 21 to engage the wheel and a circular-section shank 22 with an external thread 23 and an internal thread 24. On the shank is screw threaded a pinion gear 25 in constant mesh with the teeth on the sun wheel. While it is preferred that the pitch of threads 23, 24 is the same, the pitch of thread 23 may be slightly smaller than that of thread 24.

The outer end of the nut shank is reduced to afford a neck 26, on which is screw threaded a boss 27 formed integrally with a friction plate 28. The boss is journalled at 29 in a hole within the mounting plate. The nut assembly is rotatably secured to the mounting plate by a stud 30 screwed into the outer end of the nut 19.

A coil compression spring 31 is mounted on the nut shank 22 between the pinion 25 and an integral hexagon collar 32 near the inner end of the nut.

In operation, the pinions 25 are first rotated by the hexagon collars 32 to engage their friction plates 28 with a predetermined torque. Screw thread 23 is right handed and boss 27 is mounted on neck 26 by a left hand thread so that when the pinion 25 first engages plate 28 the left hand thread ensures that the plate 28 cannot move away from the advancing pinion. In this way the predetermined torque is not reduced during use.

To mount a wheel, the mounting plate 11 carrying the fixing nuts 19, gear wheel 18 and hub cap 13, is positioned to align the nuts with the studs 20 on which the wheel has been placed. The hub cap 13 is then rotated, whereupon the sun gear wheel rotates simultaneously all the planet pinions, and due to the friction between the pinions and their friction plates 28, the fixing nuts are tightened together. If there are no irregularities, all the nuts will tighten equally at the same time, but if one nut binds before the others it will stop turning, and further rotation of the sun gear wheel will cause the pinion of that nut to continue to turn to break the frictional connection between itself and its friction plate, until it rotates freely on the shank 22. The remaining nuts will continue to be tightened together or in sequence in a similar manner until all are tight to the same degree and the wheel is securely mounted.

To remove a wheel, the reverse process is followed, any loose pinion being first brought into frictional engagement with its friction plate, whereafter the fixing nuts are loosened and removed.

If desired, a non-metallic friction washer (not shown) may be placed between each pinion and its friction plate.

Figure 4:
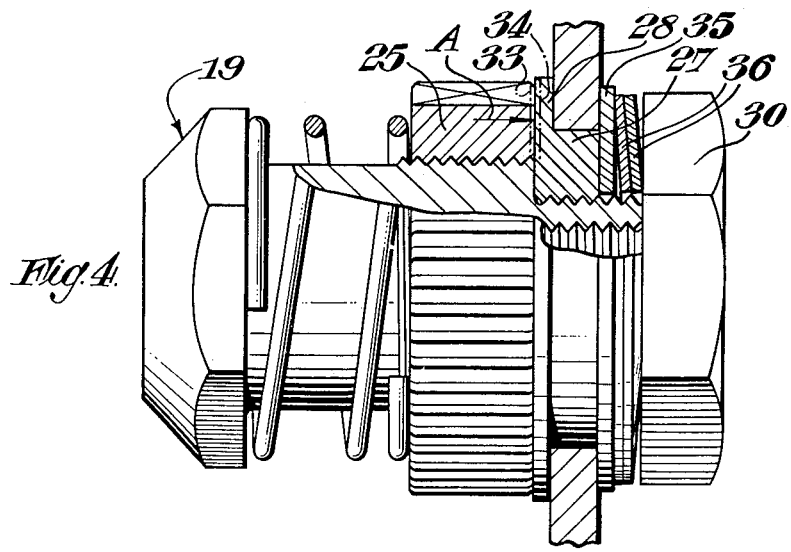
FIG. 4 is a view corresponding to FIG. 3 showing another construction of nut.

To ensure that the predetermined torque is not reduced after use e.g. because of looseness in the parts due to wear means may be provided to augment the torque, the extent of the increase being selectable and adjustable. Such an arrangement of nut is illustrated in FIG. 4. The arrangement is similar to that of FIG. 3 wherein, however, a washer 35 is interposed between the boss 27 and stud 30 together with conical spring discs 36. Two discs are shown but one or more than two may be used.

When the stud is drawn up it compresses the spring discs 36 and this is done to a predetermined extent on assembly. In use the stud may be adjusted to vary the compression e.g. to increase it to compensate for looseness in the parts due to use.

When the nut 19 is drawn up on stud 20 and thereafter the pinion commences to turn on the nut it will, at the very beginning of such turning movement, rotate plate 28 with it. Boss 27 being on a left-hand thread while pinion 25 is on a right-hand thread the turning movement so imparted to plate 28 moves the boss axially compressing spring discs 36. This additional force of compression is applied to nut 19 to augment the torque. On removal of the nut 19 when pinion 25 is re-engaged with plate 28 boss 27 will be moved axially to release the additional compression of discs 36.

Figure 5:
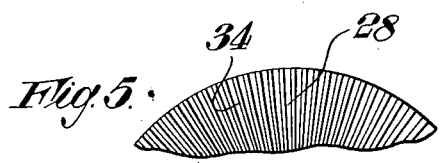
FIG. 5 is a view of a detail of construction of another nut arrangement.

If a relatively larger compression of discs 36 is required the abutting faces of the pinion 25 and plate 28 are formed with radial teeth which inter-engage. These mating teeth are indicated in FIG. 4 at 33 and 34 respectively. The teeth on plate 28 are also shown in FIG. 5 this being a view of a part of the toothed plate 28 in the direction of the arrow A. When pinion 25 is rotated, immediately before the pinion separates from plate 28 the mating teeth will positively drive the plate 28 so that spring discs 36 are compressed by an amount determined by the combined height of the teeth on the pinion and the plate. Thereafter the teeth will disengage.

With each of the constructions described it will be clear that the entire operation of removing and mounting a road wheel may be carried out with great expedition and ease and that all wheels are uniformly and securely mounted on their hubs.

I claim:

1. A wheel mounting device for a road vehicle wheel comprising: a mounting plate; a plurality of wheel retaining nuts rotatably mounted on said plate at positions corresponding to points of wheel attachment; a pinion carried on each nut, said pinion having a radial friction surface thereon; an annular plate carried on each nut, said plate having a radial friction surface adapted to be engaged by the radial friction surface on said pinion to provide a driving connection between said pinion and said annular plate; a sun gear wheel journalled in said mounting plate for simultaneously rotating said pinions and each of said nuts through said driving connection; means for rotating said sun gear wheel; means for disengaging said friction surfaces during rotation of said pinions on breaking said driving connection after the application of a predetermined torque to each of said nuts; and a spring on each nut the spring load of which is arranged to be increased through rotation of said pinions by said sun gear wheel at the same time as said driving connection is being broken thereby to augment the torque required to break such connection.

2. A wheel mounting device as claimed in claim 1 in which said annular plate is movable axially of the nut to compress said spring.

3. A wheel mounting device as claimed in claim 1 wherein the spring for each pinion is adjustable to provide a required load at which the driving connection is broken.

4. A wheel mounting device as claimed in claim 1 in which the spring comprises one or more conical spring discs.

5. A wheel mounting device as claimed in claim 1 wherein the friction surfaces on the pinion and the annular plate on the nut are provided with mating teeth for moving the plate axially to a predetermined extent before the driving connection is broken.

6. A wheel mounting device according to claim 5 in which the teeth extend radially of said plate and of the pinion.

7. A wheel mounting device as claimed in claim 1 in which each of said nuts is internally threaded for connection to wheel studs and wherein said means for disengaging said friction surfaces includes an externally threaded shank on each nut for mounting said pinion, the pitch of the thread connecting each pinion to its shank being the same as that connecting each nut to its wheel stud.

8. A wheel mounting device as claimed in claim 1 wherein the nut is formed with a shank having a neck at its outer end and said annular plate is formed integrally with a boss fitted in said neck.

9. A wheel mounting device as claimed in claim 8, wherein the nut is journalled by the boss of said annular plate in the mounting plate.

10. A wheel mounting device as claimed in claim 9, wherein the boss is threaded on the neck by a thread which is oppositely handed to the thread by which the pinion is mounted on the shank of the nut.

11. A wheel mounting device as claimed in claim 8, in which a stud external to the mounting plate is threaded into the outer end of the shank neck.

12. A wheel mounting device as claimed in claim 1 in which the pinion is screwed on a shank of the nut immediately adjacent said annular plate, the pinion being movable axially of the shank to disengage the screwed portion thereof, and including means for urging the pinion towards said screwed portion.

13. A wheel mounting device as claimed in claim 12 in which the means for urging the pinion towards said screwed portion is a coiled spring mounted on the nut shank between the pinion and a collar on the inner end of the shank.

14. A wheel mounting device for a road vehicle wheel comprising: a mounting plate; a plurality of wheel retaining nuts rotatably mounted on said plate at positions corresponding to points of wheel attachment, each of said nuts being internally threaded for connection to wheel studs and having an externally threaded shank; a pinion threadedly mounted on each shank, said pinion having a friction surface towards one end thereof; an annular member carried on each nut, said member having a friction surface adapted to be engaged by the friction surface of said pinion to provide a driving connection between said pinion and said annular member; a sun gear wheel journalled in said mounting plate and engaging said pinions to simultaneously rotate said pinions and each of said nuts through said driving connection; and means for rotating said sun gear wheel; said friction surfaces being adapted to be disengaged by screwing motion of said pinion along the threaded nut shank away from the annular member during rotation of said pinion on breaking said driving connection after the application of a predetermined torque to each of said nuts.

15. A device according to claim 14 in which each pinion is screwed on the nut shank immediately adjacent the annular member, the pinion being movable axially of the shank to disengage the threaded portion thereof, and including spring means for urging the pinion towards said threaded portion.

16. A device according to claim 14 in which each nut shank has a threaded neck at its outer end, said annular member is formed integrally with a boss screwed on said neck, the nut is journalled by said boss in the mounting plate, and the neck thread is oppositely handed to the shank thread.

References Cited in the file of this patent

UNITED STATES PATENTS

| | | |
|---|---|---|
| 1,846,543 | Clench | Feb. 23, 1932 |
| 2,191,081 | Menken et al. | Feb. 20, 1940 |
| 2,360,887 | Parker | Oct. 24, 1944 |
| 2,427,153 | Mossberg | Sept. 9, 1947 |
| 2,525,379 | Smilansky | Oct. 10, 1950 |
| 2,616,322 | Spreng | Nov. 4, 1952 |
| 2,731,864 | Davies et al. | Jan. 24, 1956 |
| 2,743,637 | Redmon | May 1, 1956 |

FOREIGN PATENTS

| | | |
|---|---|---|
| 108,532 | Great Britain | Aug. 13, 1917 |
| 270,131 | Great Britain | May 5, 1927 |